United States Patent [19]

Manier et al.

[11] Patent Number: 5,236,788

[45] Date of Patent: Aug. 17, 1993

[54] IRON-BASE ALLOY STRUCTURAL COMPONENT HAVING A CORROSION-INHIBITING COATING

[75] Inventors: Karl-Heinz Manier, Scheyern; Gerhard Wydra, Oberschleissheim, both of Fed. Rep. of Germany

[73] Assignee: MTU Motoren- Und Turbinen-Union Muenchen GmbH, Muenchen, Fed. Rep. of Germany

[21] Appl. No.: 646,890

[22] Filed: Jan. 28, 1991

[30] Foreign Application Priority Data

Feb. 2, 1990 [DE] Fed. Rep. of Germany ....... 4003038

[51] Int. Cl.⁵ .......................... F01D 5/30; B32B 15/08
[52] U.S. Cl. .................................. 428/626; 428/652; 428/679; 416/219 R; 277/235 A
[58] Field of Search ............... 428/621, 624, 625, 626, 428/627, 652, 679; 277/235 R, 235 A, 236; 416/241 A, 219 R, 220 R

[56] References Cited

U.S. PATENT DOCUMENTS

| | | | |
|---|---|---|---|
| 2,759,250 | 8/1956 | Schaefer et al. | 428/652 |
| 3,597,172 | 8/1971 | Bungardt et al. | 428/679 |
| 3,859,061 | 1/1975 | Speirs et al. | 428/652 |
| 3,887,731 | 6/1975 | Dean et al. | 428/679 |
| 3,979,534 | 9/1976 | Rairden | 428/652 |
| 4,051,585 | 10/1977 | Walker et al. | 416/219 R |
| 4,169,694 | 10/1979 | Sanday | 416/219 R |
| 4,188,458 | 2/1980 | Hugosson et al. | 428/626 |
| 4,241,147 | 12/1980 | Baldi | 428/652 |
| 4,279,575 | 7/1981 | Avery | 416/241 A |
| 4,695,516 | 9/1987 | Masuhara et al. | 428/653 |
| 4,859,506 | 8/1989 | Puchinger et al. | 427/372.2 |
| 4,980,241 | 12/1990 | Hoffmueller et al. | 428/607 |
| 5,006,419 | 4/1991 | Grunke et al. | 428/623 |
| 5,087,512 | 2/1992 | Uihlein et al. | 428/632 |
| 5,160,243 | 11/1992 | Herznor et al. | 416/220 K |

FOREIGN PATENT DOCUMENTS

| | | | |
|---|---|---|---|
| 341455 | 11/1989 | European Pat. Off. | 416/219 R |
| 2907072 | 10/1979 | Fed. Rep. of Germany | 428/652 |
| 3906187 | 10/1989 | Fed. Rep. of Germany. | |
| 3815977 | 11/1989 | Fed. Rep. of Germany. | |

Primary Examiner—John Zimmerman
Attorney, Agent, or Firm—W. G. Fasse

[57] ABSTRACT

A structural component made of an iron-base alloy is provided with a corrosion inhibiting coating which has three layers, namely a primary coating or layer, an intermediate layer, and a top coating or layer. A fourth sealing coat is optional. The primary coating is a nickel or cobalt coating. The intermediate layer comprises intermetallic compounds of nickel aluminide or cobalt aluminide. The top coating is an aluminum base or aluminum alloy base high-temperature lacquer including a binder. Such a combination coating is especially resistant to fretting, oxidation and etch corrosion. The component is suitable especially for parts of gas turbine engine housings. The intermediate layer is formed after application of the primary coating and of the top coating, by a heat treatment within a reaction temperature range in which intermetallic nickel aluminum or cobalt aluminum compounds are formed.

9 Claims, No Drawings

IRON-BASE ALLOY STRUCTURAL COMPONENT HAVING A CORROSION-INHIBITING COATING

FIELD OF THE INVENTION

This invention relates to a structural component made of an iron-base alloy and having a corrosion-inhibiting coating.

BACKGROUND INFORMATION

It is known to protect components made of iron-base alloy against corrosion by coating or plating with tin, zinc, nickel, chromium or aluminum. Such corrosion-inhibiting coatings have the disadvantage that they fail in an oxidizing, sulphidizing, or chlorine-containing atmosphere at temperatures above 500° C. when the component is simultaneously exposed to fretting corrosion.

German Patent Application P 38 15 977 discloses intermediate foil inserts for protecting fits between co-operating components from fretting. These known foil inserts have the disadvantage that each fit exposed to fretting must be provided with two foils each having a differently prepared or coated surface.

OBJECTS OF THE INVENTION

In view of the above it is the aim of the invention to achieve the following objects singly or in combination:

to provide a component made of an iron-base alloy with a protective coating, which assures protection against fretting corrosion, oxidative attack and etching corrosion; and to provide a protective coating which fits between structural components made of an iron base alloy for protection under fretting loads in an oxidizing, sulphidizing, or chlorine-containing gas stream at temperatures above 500° C., preferably 600° C.

SUMMARY OF THE INVENTION

The foregoing objects have been achieved by the present invention in a protective coating comprising a primary coating of a nickel-base and/or cobalt-base material, an intermediate layer of intermetallic compounds of NiAl or CoAl, and a top coating of a high-temperature lacquer of an aluminum-base or aluminum-alloy base material.

The present protective coating has the advantage that the primary coating made of a nickel-base and/or cobalt-base material compensates differential thermal expansions between the component and the intermediate layer made of intermetallic compounds and relieves stresses between the intermediate layer and the material of the structural component to be protected. This nickel-base and/or cobalt-base primary coating also contains alloying constituents which permit a precipitation hardening of the primary coating.

Another advantage is provided in that the intermetallic compounds are not present within the surface zone of the structural component, where they would reduce the fatigue strength of the component by 30%. Rather, the intermetallic compounds are arranged outside the structural component as an intermediate layer in the corrosion-inhibiting coating. The intermediate layer of intermetallic compounds protects the primary coating against oxidation and so ensures protection against fretting corrosion at mating component areas when the top coating layer is damaged. The ductile top coating made of a high-temperature aluminum base and/or aluminum-alloy-base lacquer simultaneously improves or rather reduces the sliding friction by reducing the coefficient at the fitting between two components areas to thereby reduce fretting corrosion. The proportion by weight of the aluminum and aluminum alloy in the ductile top coating layer is within the range of 20% wt. to 60% wt. metal particles in the high-temperature lacquer. The remainder comprises a binder selected from phosphate, silicate, alkyl silicate or silicone resin base materials. The operating temperatures depend on the type of binder. A phosphate binder permits an operating temperature of about 800° C. A silicone binder permits an operating temperature of 500° C.

Another advantage of the intermediate layer is seen in that it assures an intimate bonding between the top coating and the primary coating.

In a preferred embodiment of the present invention, a primary coating of nickel is alloyed with boron or phosphorus which combine with the base material of the primary coating to form phosphides or borides at 500° C. to 700° C., whereby the primary coating layer is precipitation hardened and thus provides improved protection against fretting corrosion.

A preferred material for making the structural component itself is an iron-nickel alloy with 30 to 42% Ni, 8 to 20% C, 3 to 5% Nb and Ta, 1 to 2% Ti and 0.2 to 1.2% Si by weight. This alloy has the advantage of a comparatively low thermal expansion coefficient, which makes it especially suitable for use in housings for gas turbine engines, provided that a corrosion-inhibiting coating according to the present invention is used to reduce fretting, oxidation, and corrosion.

The service temperature and the life of housing components made of hardened and tempered chrome steels for gas turbine engines, is improved by the use of components with corrosion coatings of the present invention, where as a base material for the component, a hardened and tempered chrome steel is used having the following alloy components of 8 to 15% chrome, 2 to 5% nickel, and 1 to 3% Mo by weight.

The present corrosion-inhibiting coating can be sealed by a binder high-temperature lacquer. Maximum service temperatures can be achieved, as mentioned above, by a phosphate-base sealing, which can withstand thermal loads as high as 800° C. The temperature resistance of silicate binders is substantially the same. For lower loads to a minimum of 500° C., suitable sealing coatings are butyl titanate, alkyl silicate and silicone resin binders.

A method for manufacturing structural components according to the invention comprises involves the following process steps. The component surface is first degreased and cleaned to remove inorganic particles. A nickel-base and/or cobalt-base primary coating is then applied which is then coated with an aluminum-base and/or aluminum-alloy-base high-temperature lacquer. The high-temperature lacquer is then dried and/or stoved, after which the component with the coating on it is heated to a reaction temperature to form an intermediate layer of the intermetallic compounds NiAl or CoAl at the interface between the primary coating and the high temperature lacquer.

The present method provides the advantages of being low-cost and suitable for mass production. Nickel or cobalt is preferably obtained by currentless chemical deposition on the component. Additions of, e.g. boron or phosphorus, can be used to improve the hardness of the primary coating.

Another preferred method for depositing the primary coating is the electrodeposition or galvanizing of the component in a nickel or cobalt bath, an electrodeposition or galvanizing of the component in a nickel and cobalt bath containing nickel and cobalt in a stoichiometric ratio, whereby advantageously a high throughput in the galvanizing bath is achieved.

An improved coating quality, density and purity is preferably achieved by sputter or vapor deposition of the material on the material of the structural component.

An improved bonding strength is additionally achieved by cleaning and removing the surface of the component in an evacuated recipient by means of an electron beam or an argon plasma beam before the primary coating is deposited.

In a preferred aspect of the present invention the high-temperature lacquer is dried at 20° C. to 80° C. for 10 minutes to 60 minutes and/or stoved at 20° C. to 350° C. for 0.5 hours to 5 hours. For silicate and silicone resin binders, the step of stoving merely involves curing the high-temperature lacquer at 20° C. to 30° C., which provides an advantage because it reduces manufacturing costs. For achieving the fretting-inhibiting capability it is important to form the oxidation-inhibiting intermediate layer of intermetallic compounds for preventing the destruction of the primary coating. This intermediate layer of intermetallic compounds is 0.5 $\mu$m to 5 $\mu$m thick and is formed at the same time as the base coat is precipitation hardened, which is preferably performed at 550° C. to 650° C. for a duration of 2 to 200 hours.

If the foregoing process step is performed in an oxidizing atmosphere, the aluminum and aluminum alloy particles near the surface of the high-temperature lacquer will oxidize to form oxidationresistant $Al_2O_3$. Aluminum alloy particles in the high-temperature lacquer provide an advantage compared to aluminum particles in that the allowable service temperature for the high-temperature lacquer can be increased by suitably selecting the respective alloying component.

EXAMPLE EMBODIMENTS

Example 1

A structural component made of an iron-nickel alloy containing 37% nickel, 14% cobalt, 4.8% Nb and Ta, 1.5% Ti and 0.4% Si by weight, the remainder being iron, is first blasted with $Al_2O_3$ to remove adhering inorganic contaminations and to compact the surface. After degreasing and roughening of the surface the component is dipped in a currentless deposition solution of nickel to form a primary coating having a thickness of about 5 $\mu$m. At the same time 10% by weight phosphorus is incorported in the 5 $\mu$m nickel primary coating. The component is then dipped in an inorganic high-temperature lacquer comprising 30% by weight aluminum and the remainder being phosphate binder to form a dipped coating having a thickness of about 50 $\mu$m. The dipped coating is cured at 350° C. for 30 minutes to form the top coating which is then exposed to a temperature of 560° C. for 2 hours to form an intermediate layer of intermetallic nickel-aluminide having a thickness of about 1 $\mu$m. At the same time, nickel-phosphide segregation occurs in the base coat, which improves the precipitation hardening process and adapts the thermal expansion of the primary coating to the material of the structural component. These steps complete the manufacture of the structural component with a multi-layer corrosion-inhibiting coating, which is now exposed to temperature test cycles in an oxidizing and corrosive atmosphere.

Example No. 2

The surface of a structural component made of quenched and tempered chromium steel containing 12% chrome, 2.5% nickel, 1.7 Mo, by weight, the remainder being iron, is decreased and cleaned of inorganic contaminations, and then electroplated to produce a primary coating of cobalt having a thickness of 20 $\mu$m. A top coating of a high-temperature lacquer containing 20% by weight aluminum alloy powder and a silicate binder is sprayed onto the electrodeposited primary coating. The top coating is then dried at room temperature for 10 minutes and cured at 300° C. for 1 hour. Thereafter, an intermediate layer of cobalt aluminide is formed at a temperature of 630° C. applied for 100 hours. The intermediate layer has a thickness of about 1.5 $\mu$m.

Although the invention has been described with reference to specific example embodiments it will be appreciated that it is intended to cover all modifications and equivalents within the scope of the appended claims.

What we claim is:

1. A structural component made of an iron-base alloy, comprising a fretting and corrosion inhibiting coating including a thermal expansion compensating primary layer in contact with a surface of said iron-base alloy component, said primary layer being made of a nickel-base metal, an intermediate layer on said primary layer, said intermediate layer comprising intermetallic compounds selected from the group consisting of NiAl and CoAl for protecting said primary layer against oxidation and fretting, and a top layer made of a metal component and a binder component, said metal component being selected from the group consisting of an aluminum-base metal and an aluminum alloy-base metal, said binder component being a high-temperature lacquer resistant to temperatures up to about 800° C., said top layer being ductile for reducing fretting corrosion, and wherein said primary layer of a nickel base metal contains segregations within the range of 0.5% to 10% by weight selected from the group consisting of boron and phosphorus in the form of nickel boride and nickel phosphide, whereby said primary layer is precipitation hardened.

2. The structural component of claim 1, wherein said iron-base alloy of said structural component comprises an iron-nickel alloy containing 30 to 42% nickel, 8 to 20% Co, 3 to 5% Nb and Ta, 1 to 2% Ti and 0.2 to 1.2% Si, all by weight.

3. The structural component of claim 1, wherein said iron-base alloy of said structural component comprises a quenched and tempered chromium steel.

4. The structural component of claim 1, further comprising a seal coat on said top coating, said seal coat comprising a binder of said high-temperature lacquer.

5. The structural component of claim 1, wherein said intermediate layer has a thickness within the range of 0.5 $\mu$m to 5.0 $\mu$m.

6. The structural component of claim 5, wherein said intermediate layer has a thickness within the range of 1.0 to 1.5 $\mu$m.

7. The structural component of claim 1, wherein said top layer of high temperature resistant lacquer has a temperature resistance at a temperature of at least 500° C. and up to about 800° C.

8. The structural component of claim 1, wherein said top layer of high temperature resistant lacquer has a thickness of up to 50 μm.

9. The structural component of claim 1, wherein said high temperature resistant top layer comprises 20% wt. to 60% wt. of said metal component, said binder component being a member selected from the group consisting of phosphate, silicate, alkyl silicate, and silicon resin.

* * * * *